June 15, 1971 J. D. TERRANA ET AL 3,585,237
CRYSTALLIZATION OF UREA
Filed Sept. 29, 1966 3 Sheets-Sheet 2
FIG. 2B FIG. 2C FIG. 3B
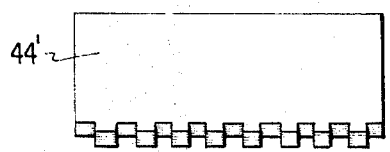  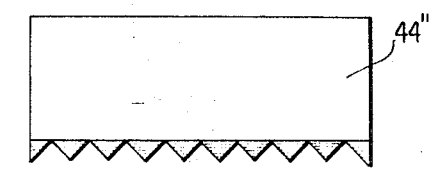
FIG. 2A FIG. 3C FIG. 3A
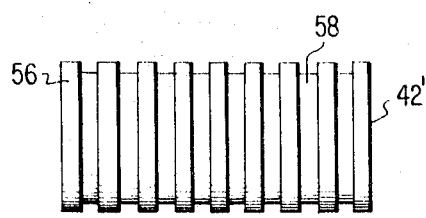 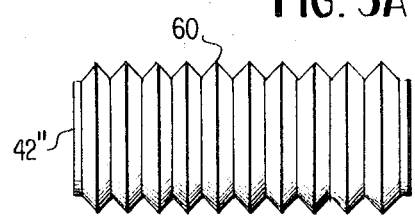
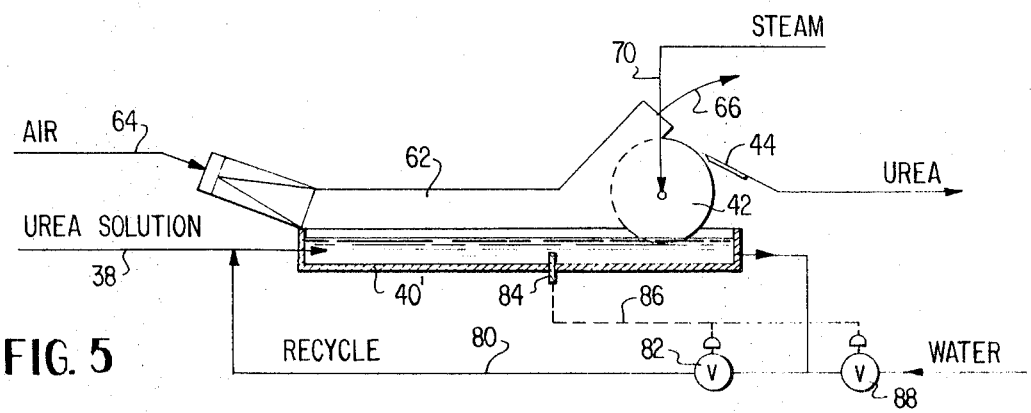
FIG. 5
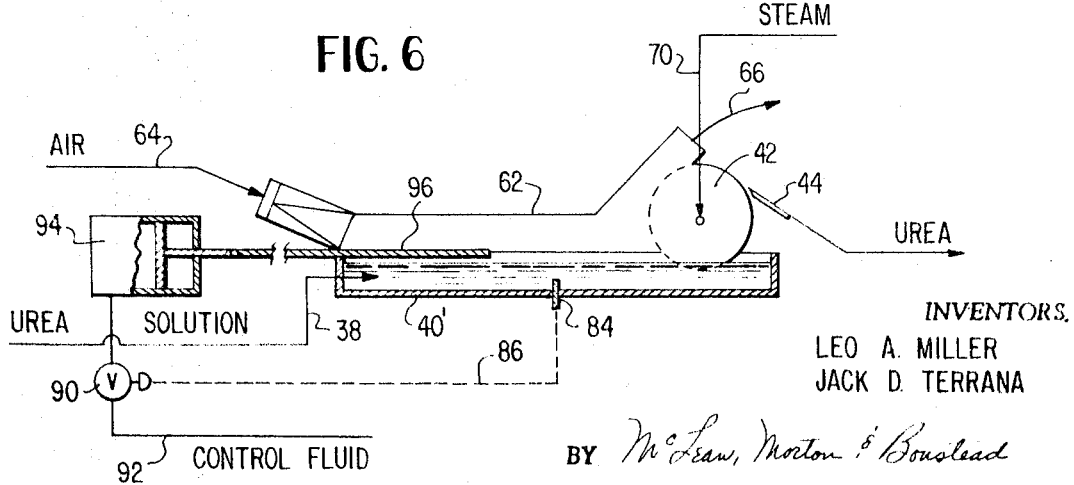
FIG. 6
INVENTORS.
LEO A. MILLER
JACK D. TERRANA
BY McLean, Morton & Boustead
ATTORNEYS.

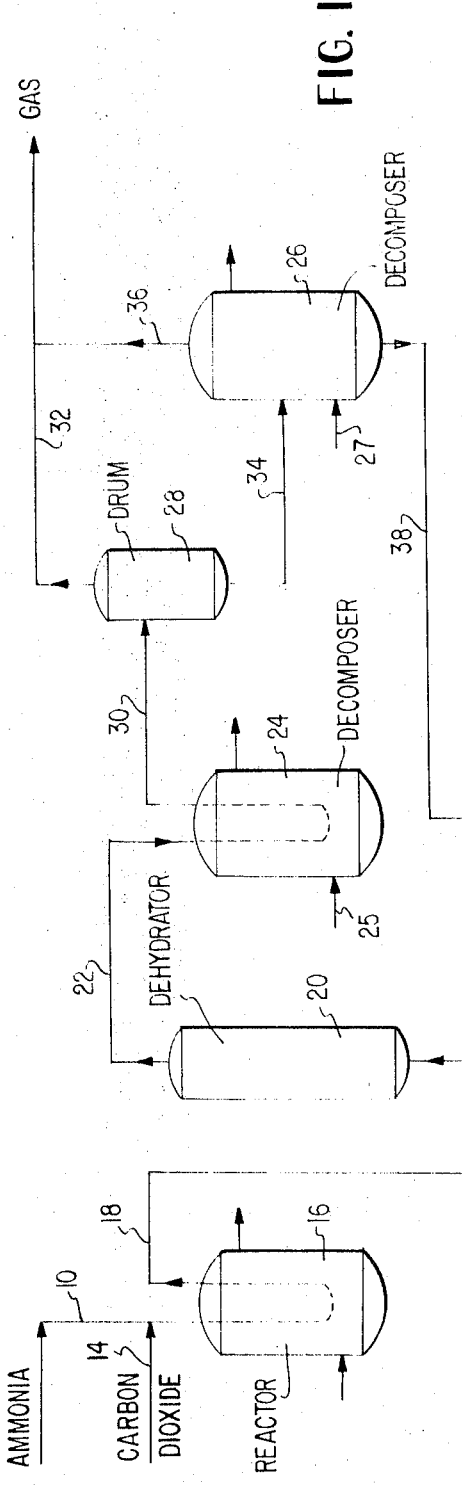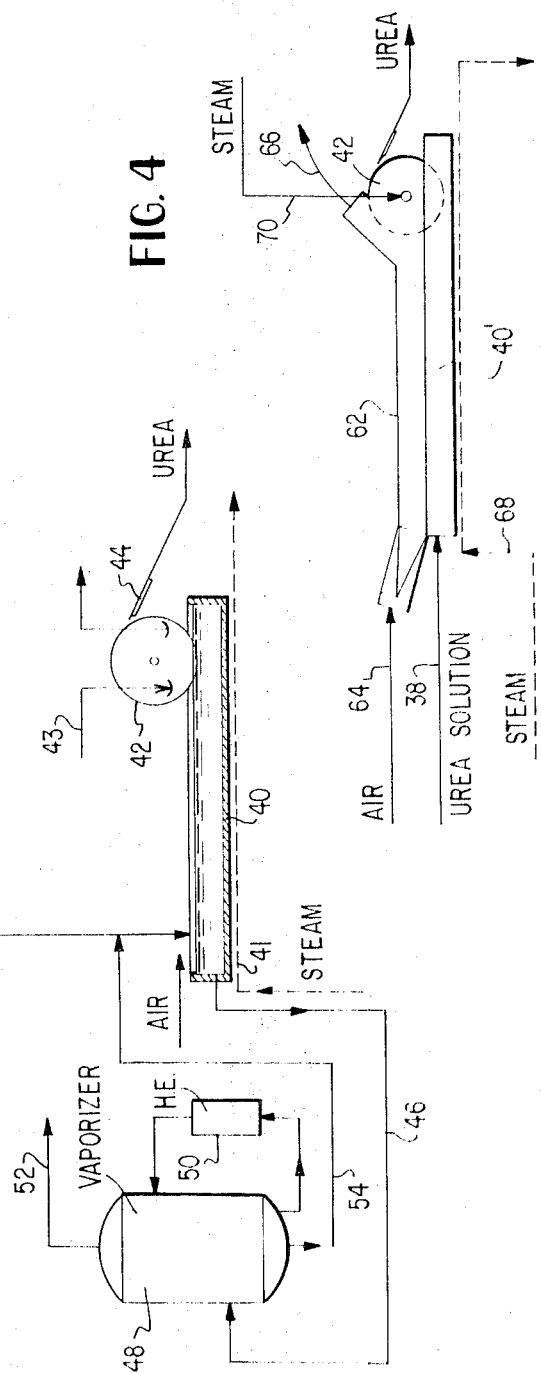

INVENTORS.
LEO A. MILLER
JACK D. TERRANA

United States Patent Office 3,585,237
Patented June 15, 1971

3,585,237
CRYSTALLIZATION OF UREA
Jack D. Terrana, Tampa, and Leo A. Miller, Lakeland, Fla., assignors to Wellman-Lord, Inc.
Filed Sept. 29, 1966, Ser. No. 582,830
Int. Cl. C07c *127/00*
U.S. Cl. 260—555                                    13 Claims

ABSTRACT OF THE DISCLOSURE

Crystalline urea having a low biuret content and a low bulk density is prepared by introducing a concentrated, aqueous solution of urea to a crystallization zone under conditions effecting evaporation of some of the water from the solution and formation of urea crystals on the solution surface. The crystals are skimmed from the solution surface onto a urea-adhering surface, for example, onto a rotating drum.

---

Figure 7:
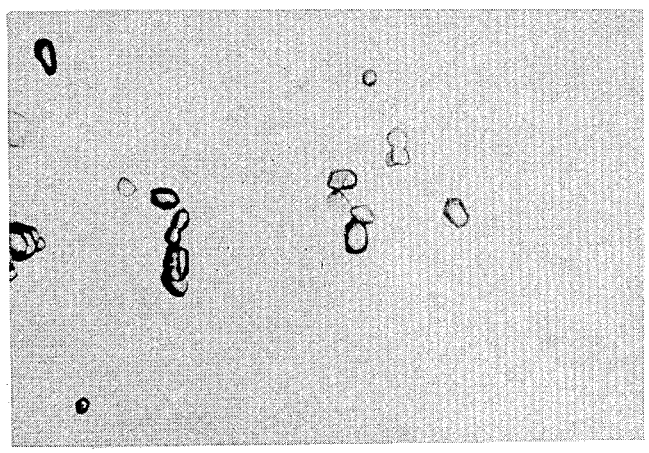

This invention relates to improvements in the production of urea. According to one aspect, it relates to the production of urea in such a fashion that urea with minimal amounts of biuret is produced in an economical process. According to another aspect, it relates to the production of substantially pure crystalline urea.

Today, urea is produced commercially by reacting ammonia and carbon dioxide under conditions of elevated temperatures and pressures in a reactor to produce ammonium carbamate which is dehydrated to produce urea. Temperatures between about 250° and 500° F., and pressures between about 1500 p.s.i.a. and 3500 p.s.i.a. are standard, although pressures up to 8000 p.s.i.a. are possible, as described in U.S. Pat. 2,087,980. The conversion-per-pass through the reactor is from 15 to 65 percent urea by weight, based on the ammonia feed, depending upon the conditions employed. The unconverted ammonium carbamate is decomposed to ammonia and carbon dioxide and the urea-containing solution is reduced in pressure and is degassed by reduction in pressure and addition of heat, if desired. The degassed urea liquid, i.e. aqueous urea solution, is then concentrated, if desired, and passed to a urea recovery unit wherein the urea is recovered in solid form either as crystals, granules, or prills. The aqueous urea solution from which urea is recovered generally contains from about 70 to 90 weight percent urea.

The operating conditions employed to recover urea from the aqueous urea solution and prepare the urea in intermediate and final marketable form are such that a portion of the urea decomposes to biuret. In fact, the biuret content of the urea product produced in the reactor is generally doubled during the degassing and concentration steps of most commercial processes. Although the portion of urea which decomposes to biuret is only a relatively small portion of the whole, it is undesirable, nevertheless, since even small percentages of biuret in urea cause undesired results in commercial applications. Biuret is toxic toward plants and animals and must be minimized in urea utilized as fertilizers and as nutritional supplements. Biuret is also undesirable in textile applications because it causes turbidity and destroys the brilliancy of textile finishes.

In commercial installations, an especially difficult problem arises with respect to obtaining urea low in biuret content where it is desired to crystallize the entire urea product rather than either to partially crystallize it and prill the remainder, or to prill the entire product. In the past, when it has been desired to crystallize the entire urea product out of the solution, the continuous crystallization of urea from the solution or mother liquor resulted in an increasing concentration of biuret in the mother liquor in the crystallizer and the urea crystals produced were high in biuret content. In an effort to retard the formation of biuret in the urea crystals, biuret-containing mother liquor was continuously withdrawn from the crystallizer as a waste product. Such an expedient was necessary to produce urea crystals low in biuret content because of the equilibrium relationship between the biuret in the mother liquor and the biuret in the urea crystals. The equilibrium is such that the percentage of biuret in the mother liquor is about 10 times that present in the urea crystals and, as a consequence, as the biuret concentration in the liquor increases, urea crystallizes with a proportionally higher biuret content.

The urea crystals recovered from this solution are generally compacted to produce non-caking granules. The problem of economically producing urea crystals low in biuret content and in large quantities has been significantly advanced as a result of a recently developed compacting process whereby substantially non-caking granules are economically produced from urea crystals wherein the biuret content of the crystals produced is substantially unchanged by the compacting process, thus the biuret content of the compacted urea crystals is substantially the same as the biuret content of the urea crystals introduced into the compacting process.

One of the major problems still confronting the industry resides in the matter of avoiding the formation of, or a substantial increase in, the biuret content of the urea recovered in crystal form from the aqueous urea solution, for instance a urea solution containing from about 70 to 90 weight percent urea. A major drawback to prior methods for reducing biuret in urea is that they are extrinsic or appended to the process itself, requiring additional processing of the urea product. Costly additional equipment and chemicals are necessary to the operation of these extrinsic methods and, consequently, they are not economically attractive. Furthermore, the final product so obtained is adulterated by residual chemicals.

An object of the present invention is to provide a process which avoids the formation of, or a substantial increase in, the biuret content of urea produced from an aqueous urea solution, which process overcomes the technical and economic disadvantages of prior art methods. Another object is to provide substantially pure urea crystals, for instance crystals with an extremely low biuret and moisture content. Another object is to provide an improved method for the production of urea crystals, low in biuret, as a part of the urea production process. Other objects of the present invention will be apparent to those skilled in the art from the accompanying specification and disclosure.

In accordance with the process of this invention, urea crystals are produced and recovered in the presence of a moisture-absorbing, chemically inert gas and from a heated but relatively cool aqueous urea solution as crystals on a heated, urea-adhering surface, e.g. the surface of a rotating drum. Since biuret formation is a function of temperature and concentration of urea, the amount of biuret formed in this crystallizing process is very low, e.g. less than about 0.05, or 0.10 percent, which is considerably less than the amount produced in conventional processes, e.g. 0.5 to 1.5 percent biuret.

In general, aqueous urea solutions suitable for use in this invention contain from about 70 to 92 weight percent urea and can be produced according to conventional methods such as those described above.

The process for producing the urea solution can be operated to provide a urea solution having a concentration of urea sufficient for direct use in the process of the present invention and thus avoid any desirability for recycling a too dilute urea solution and, if desired, the dilute urea solution produced upon crystallization and recovery of urea in accordance with this invention can be reconcentrated and recycled to the crystallization zone. Reconcentration can be accomplished by vaporizing the dilute urea solution at a temperature to avoid biuret formation, preferably about 140° F. to 180° F., and a pressure generally from about 3 to 10 p.s.i.a., preferably about 8 p.s.i.a.

The urea solution employed in the process of the present invention is heated in the presence of the inert, moisture-absorbing gas in a crystallization zone at a temperature sufficient to vaporize water from the solution and form urea crystals on the surface of the solution while avoiding the formation of biuret. Advantageously, the urea solution is vaporized, or concentrated, in a crystallization zone involving the provision of the urea solution in a relatively shallow pond of substantial surface area, for example, in a shallow, heated pan. A pan depth of several inches, for instance 1 to 12 inches is suitable.

The gas employed in the present invention is inert in that it does not materially affect the chemical composition of the urea solution, the urea crystals produced, or the crystallization of urea. Advantageously it is not saturated under the conditions of crystallization, i.e. when in contact with the urea solution, and is thus capable of absorbing moisture to provide for crystal formation. Suitable inert gases include air, nitrogen, methane and the like but air is preferred. The process of the present invention can be conducted in the presence of unsaturated air under ambient atmospheric conditions, for instance air under ambient pressures and at temperatures generally from about −20° F. to 100° F. In a preferred embodiment of this process, a stream of inert gas in conducted over the surface of the urea solution from which crystals are being produced at a linear velocity sufficient to enhance crystallization of the urea.

The urea crystals produced by the solution are contacted with the heated urea-adhering surface, the crystals adhere to the surface, and are removed from the solution. The surface is generally heated to a temperature above about 175° F. and below the melting point of the urea crystals and can be composed of any material to which the urea crystals will adhere. The preferred materials include type 316 stainless steel and chrome but other materials such as mild steel, Type 304 stainless steel and the like can also be used.

The urea-adhering surface or crystal recovering surface is advantageously a rotating drum although other means for providing a heated surface for recovering the crystals such as belt conveyors and pan skimmers, for instance, are also contemplated. The crystal-recovering surface, e.g. a rotating drum, is arranged to skim the surface of the urea solution in the pan, e.g. at a depth of about $\frac{1}{16}$ inch to 2 inches, or even 6 inches, below the surface of the solution.

The latent heat of vaporization of the water from the solution in the pan crystallizer chills the surface of the urea solution and urea crystals form in a thin layer, e.g. on the order of $\frac{2}{100}$ inch thick, on the surface of the urea solution in the crystallization pan in the ratio of latent heat of vaporization of water (970 B.t.u./lb.) to the latent heat of fusion of urea (104 B.t.u./lb.). Therefore, heat has to be applied to the crystallization pan or the urea solution would soon be a solid mass. The heat added is controlled to give the desired crystal density on the surface of the solution in the pan. The purity of the crystal product of this invention is a function of the temperature of the urea solution in the crystallization pan and increases from a purity of about 91 percent at about 170° F. to above 99 percent purity at temperatures above about 185° F. In general, however, the temperature of the urea solution in the crystallization pan is maintained above the melting point of the solution and below the temperature at which biuret is formed, generally from about 170° F. to 250° F., or 270° F., preferably about 185° F. or 190° F. to 210° F.

As the urea solution is introduced into the crystallization pan and urea crystals begin to form on the surface of the liquid, the crystals migrate toward the flaking drum which is generally arranged opposite to the point of entry of the solution into the pan. Although it would appear that larger crystallization pans would be preferred since there would be more surface area available for crystallization, the surface area of the pan must not be so large that control of the temperature of the urea solution in the pan is lost and migration of the crystals is prevented. Also, the concentration of the urea solution in the crystallization pan is affected by the surface area of solution available to evaporation and the concentration of this solution is important since it affects the purity of the urea crystals produced. In general, the urea solution in the crystallization pan is controlled to maintain a concentration of between about 70 to 92% urea, preferably about 79 to 87.5%, and particularly about 84% when urea of 99 percent purity is desired. Control of the concentration can be done, for example, by controlling the feed to the crystallization pan, by recycling a controlled amount of solution in the pan and adding water if necessary, by controlling the surface area of the solution, by controlling the amount of inert gas passed over the surface of the solution in the crystallization pan or any other suitable means.

The temperature of the flaking surface, e.g. on the drum is generally maintained about the same as the solution in the crystallization pan, e.g., as mentioned, about 175° F. and up to the melting point of the urea crystals and the temperature of biuret formation, e.g. 250° F. to 270° F. The crystals formed in the crystallization pan actually flow toward the drum because there are less crystals per unit area there. The molten urea attaches itself to the drum flaker and is rotated around to a doctor blade where it is flaked off. To produce urea of above 99 percent purity, the purity of the molten crystals in the crystallization pan should be above 91 percent. At this purity, or above, the latent heat of crystallization, which is exothermic, can drive off the water and produce high purity, e.g. above 99 percent, urea crystals.

The urea crystals have a residence or contact time on the surface of the flaker drum sufficient to allow the latent heat of vaporization to drive off the water which in general is at least about seven to thirty seconds, with the upper limit being a matter of economics. The required time is a function of the purity of the urea crystals as they come onto the drum, the thickness of the film of crystals on the drum and the desired purity of the urea product, as well as the drum temperature, size, etc. As mentioned above, an inert gas, e.g., air, is advantageously blown acros the surface of the urea solution in the crystallization pan to remove the air above the solution which becomes saturated with moisture and provides dry air which then becomes saturated as additional water is evaporated from the surface of the solution and urea crystals form.

The process of this invention produces a new crystalline form of urea which has a biuret content substantially the same as that of the 70 to 92% urea solution, e.g. less than about 0.10 percent, usually less than about 0.05 percent, and which can be pelletized. It has a moisture content which is generally less than about 1 weight percent. The crystalline urea is characterized by a low bulk density of between about 15 and 25 lb./cu. ft. as compared with 65 to 75 lb./cu. ft. for conventional urea of the same purity. The urea crystals are spheroidal-like in shape with a given crystal having a lengthwise or maximum dimension generally of about 20 to 400 microns, preferably from about 30 to 90 microns, and a minimum or widthwise dimension generally from about 15 to 350 microns, preferably from about 20 to 60 microns. The width to length ratio of a given crystal is generally from about 0.3 to 1 to 1 to 1, preferably from about 0.3 to 1 to 0.7 to 1. Conventional urea crystals are rectangular in shape and vary in length from 500 to 1500 microns with the width being about one-fourth the length.

The present invention will be illustrated with reference to the accompanying drawings.

Figure 8:
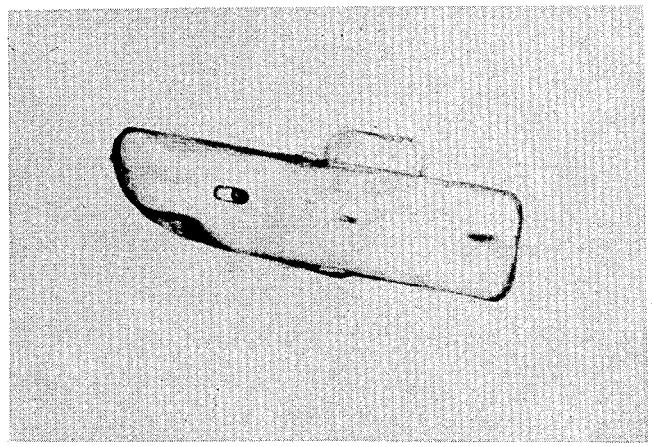

FIG. 1 is a flow sheet for a urea production process in accordance with this invention;

FIGS. 2A through C and 3A through C illustrate two embodiments of a rotating drum and companion scrapper knife suitable for use in the process of this invention;

FIGS. 4 through 6 illustrate modifications of the crystallization pan which can be used in the process; and FIGS. 7 and 8 are photomicrographs of, respectively, urea crystals produced in accordance with this invention presented to characterize the structure of the particles and of conventional urea crystals both at 100× magnification.

Referring now to FIG. 1, ammonia and carbon dioxide in the ratio between about 2.0:1 and about 15:1, preferably between about 2.5:1 and about 4:1 which are pressurized by means of compressors, not shown in the figure, are introduced through line 10 and line 14, respectively, into urea reactor 16. Reactor 16 is maintained at a pressure of between about 1,700 p.s.i.a. and about 3,500 p.s.i.a., preferably between about 2,400 p.s.i.a. and about 3,000 p.s.i.a., and a temperature of between about 300° and about 500° F., and preferably between about 330° and 400° F. The gaseous reactants form ammonium carbamate as an intermediate product, which in turn, is converted to urea and water.

The product of reactor 16 is withdrawn through line 18 and introduced into carbamate dehydrator 20 where the ammonium carbamate is dehydrated to form urea and water. The liquid product from dehydrator 20 is withdrawn through line 22 and the carbamate remaining is decomposed in decomposers 24 and 26 which are heated through steam lines 25 and 27, respectively, to vaporize the carbamate as ammonia and carbon dioxide. The product of the first decomposer 24 is passed through drum 28 via line 30 for degassing, with gas being withdrawn from drum 28 through line 32. The liquid product of drum 28 is introduced into the second decomposer 26 through line 34 for further carbamate decomposition. Gases withdrawn from decomposer 26 through line 36 are combined with the gases in line 32. The gas stream is useful in the production of ammonium nitrate. If desired, the system for producing urea can be operated with either partial or total recycle, not shown, as known in the art. With partial recycle, ammonia is condensed from the gas stream removed from dehydrator 20 and is recycled to reactor 16. Under total recycle, the carbamate in the solution from dehydrator 20, which solution also contains some urea is decomposed and removed from the solution, thus providing a urea solution of about 60 to 85 weight percent concentration.

Aqueous urea solution, the liquid product of decomposer 26, is withdrawn through line 38 and, in accordance with this invention, is introduced into a shallow crystallization pan 40 containing a flaking drum 42. Pan 40 can be heated by line 41. Drum 42 is rotated by means (not shown) and a water or steam is introduced by way of line 43 into the drum to control the temperature of the surface of the drum. Air is continuously blown across the top of pan 40. The urea solution begins to crystallize upon introduction into pan 40 and the crystals migrate toward drum 42 where they are picked up on the surface of the drum as it rotates and skims the surface of the urea solution. Knife scrapper 44 removes the urea crystals from the drum surface and the crystals are processed. The crystalline urea can be packaged, prilled, pelletized, etc., as desired, according to conventional procedures. A preferred form of processing is to heat the crystals under controlled temperature conditions to avoid biuret formation and force the heated urea through an extruder die, cutting the extruded urea to the desired length with a revolving blade.

The urea solution is fed to pan 40 at such a flow rate that the water in the solution in pan 40 is evaporated at the same rate that the urea crystals are removed from the pan by drum flaker 42. This means that with an 80 percent urea solution for every 20 pounds of water evaporated 80 pounds of urea are removed and therefore no recycle is needed. However, if the urea solution produced has a concentration below that preferred for the process of this invention, the dilute aqueous urea solution in pan 40 can be withdrawn through line 46 and introduced into vaporizer 48 where it is concentrated. The temperature of vaporizer 48 is carefully controlled to avoid biuret formation by a thermosyphon system including heat exchanger 50. Vapors are removed from vaporizer 48 through line 52 and the concentrated urea solution is withdrawn through line 54 and combined with the urea solution in line 38 to control the concentration of the solution introduced into pan 40.

FIGS. 2A and B and 3A and B illustrate two embodiments of flaking drums 42, see FIG. 1. The flaking surface of drum 42 is preferably irregular since the crystals of urea formed in pan 40 have a tendency to lift away from a smooth surface. The surface of drum 42' as shown in FIG. 2A is formed by a plurality of lands 56 and grooves 58. A serrated surface having teeth 50 is shown on drum 42" in FIG. 3. The knife 44' for use with drum 42' and knife 44" for use with drum 42" will have irregular edges corresponding to their respective drums so that urea crystals are removed from both the lands and grooves of drum 42', for example. FIGS. 2C and 3C show the knife edges in profile.

FIG. 4 illustrates a preferred embodiment of the invention wherein hood 62 covers pan 40'. Air is passed, e.g. pumped, through hood 62 across the surface of the urea solution in pan 40' from line 64. The air stream, which exits to the atmosphere as shown by arrow 66, continuously removes air which is saturated with moisture produced above the urea solution in pan 40 and aids in crystallization of the urea. Steam line 68 is used to heat pan 40', if needed, to control the temperature of the urea solution and steam or water is introduced through line 70 to control the temperature of the surface of drum 40'.

FIGS. 5 and 6 illustrate embodiments of the invention having means for controlling the concentration of the solution in pan 40'. In FIG. 5, a recycle line 80 combines the dilute urea solution produced in pan 40' with the feed solution in line 38. Valve 82 in line 80 controls the addition of recycle solution to line 38 under the command of probe 84 via control line 86. Probe 84 can be a density probe relating density of the solution in pan 40' to the concentration. Probe 84 also controls the addition of water by valve 88. In FIG. 6, probe 84 controls valve 90 in the hydraulic control line 92 for cylinder 94. A shield 96 is arranged to be movable over the surface of the solution in pan 40' by cylinder 94 and shield the solution from the air stream thereby controlling the rate of evaporation of the solution and, accordingly, the concentration thereof.

Table I sets forth the temperatures, etc., of a specific example for the production of an 80 percent urea aqueous solution.

TABLE I

|  | NH₃ to reactor | CO₂ to reactor | Reactor product | Dehydrator product | Decomposer (26) product | Gases from decomposer (24 and 26) | NH₃ from decomposer (24 and 26) | Urea solution, line 38 | Urea solution, line 54 | Urea product |
|---|---|---|---|---|---|---|---|---|---|---|
| Temperature, °F | 50 | 200 | 375 | 375 | 270 | 200 | 200 | 200 | 176 | 140 |
| Pressure, p.s.i.g. | 3,000 | 3,000 | 3,000 | 3,000 | 200 | 10 | 10 | 10 | 30 | |
| CO₂, lbs./hr | | 10,300 | | | 4,200 | 4,118 | | | | |
| NH₃, lbs./hr | 12,300 | | 4,450 | 4,450 | 7,551 | 7,572 | 7,572 | | | |
| Carbamate, lbs./hr | | | | 18,150 | 7,300 | | | | | |
| Water, lbs./hr | | | | | 2,500 | 1,410 | 1,090 | 1,410 | 3,900 | |
| Urea, lbs./hr | | | | | 8,350 | 8,350 | | 8,350 | 15,650 | 8,350 |

The results of several examples utilizing the process of this invention in the production of urea crystals are set forth in Table II to demonstrate the effect of temperature. In each of these examples, an 80% urea aqueous solution was fed to pan 40 as shown in FIG. 1.

TABLE II

| Test | A | B | C | D | E | F | G | H |
|---|---|---|---|---|---|---|---|---|
| Pan solution, temp. (°F.) | 176 | 176 | | 184 | 187 | 196 | 187 | 290 |
| Feed temp. (°F.) | 182 | 182 | 183 | 186 | 194 | 204 | 188 | 205 |
| Drum temp. (°F.) | 176 | 168 | 185 | 195 | 196 | 205 | 204 | 200 |
| Drum speed (r.p.m.) | 1¼ | 1¼ | 1¼ | 2½ | 1¼ | 2½ | 5 | 7½ | 3 |
| Drum immersion (in.) | ⅛ | ⅛ | ⅛ | ⅛ | ⅛ | ⅜ | ⅜ | ⅜ | 1½ |
| Product (percent urea) | 94.7 | 88.25 | 98.7 | 98.88 | 99.2 | 99.4 | 99.4 | 98.4 | 99.2 |
|  | No | No | No | No | No | No | No | Yes | Yes |

Table III demonstrates the effect of the concentration of the urea feed solution upon the purity of the urea crystals produced in an arrangement as shown in FIG. 4. To produce 99% pure urea, the feed solution should be between about 79 and 87.5% with a maximum being reached between these points. The rate of water removal in these examples was 2.4 lb./hr.(ft.)² surface area of feed pan when the air velocity is 7.5 ft./sec.

TABLE III

| Run | 1 | 2 | 3 | 4 | 5 | 6 | 7 | 8 |
|---|---|---|---|---|---|---|---|---|
| Feed (°F.) | 198 | 204 | 209 | 204 | 232 | 205 | 205 | 205 | 205 |
| Pan (°F.) | 203 | 208 | 228 | 200 | | 208 | 208 | 208 | 208 |
| Drum surface (°F.) | 206 | 208 | 204 | 203 | 214 | 206 | 206 | 206 | 208 |
| Drum (r.p.m.) | 3 | 3 | 2.4 | 6.7 | 2.1 | 3 | 3 | 3 | 3 |
| Feed (percent urea) | 80 | 80 | 85 | 70 | 92 | 80 | 83 | 85.05 | 87.5 |
| Product (percent urea) | 99.25 | 99.2 | 99.86 | 96.2 | 94.5 | 99.2 | 99.5 | 99.86 | 98.8 |
| Product (lb./hr.) | 40 | 44 | 38 | 56 | 264 | 42 | | | 51 |
| Product (lbs./hr. (ft.)²) | 3.2 | 3.5 | 3.05 | 4.5 | 21.2 | 3.4 | | | 4.07 |

The biuret content of the urea feed solution should be kept to a minimum since as shown by Table IV it affects the moisture content of the urea crystal produced by this invention. The temperature of the pan was raised to 230° F. to obtain a purity of 98.5%. Temperature increases, however, tend to increase the rate of biuret formation.

TABLE IV

| Run | 10 | 11 |
|---|---|---|
| Feed (°F.) | 195 | 205 |
| Feed pan (°F.) | 198 | 230 |
| Drum surface (°F.) | 204 | 205 |
| Feed (percent urea) | 80 | 80 |
| Feed (percent biuret) | 2.3 | 2.3 |
| Product (percent urea) | 96 | 98.5 |

FIG. 7 is a photomicrograph of the urea crystals produced in accordance with this invention. The particles are tetragonal crystals with an average size of approximately 40 by 60 microns. A commercially available crystalline urea was compared and is shown in FIG. 8. The particles thereof are prisms with a length approximately four times the width and having a length of about 500 to 1500 microns.

It is claimed:

1. A process for producing crystalline urea from an aqueous urea solution wherein the crystalline urea product has a biuret content substantially the same as the biuret content of the urea in the solution which comprises introducing an aqueous urea solution containing from about 70 to 92 weight percent of urea into a crystallization zone in which the solution is provided with a surface exposed to an inert, moisture-absorbing gas, maintaining the temperature of the solution in the crystallization zone within the range of about 170 to 270° F. to effect evaporation of water from the solution and formation of urea crystals on the surface of the solution, contacting the urea crystals with a urea crystal-adhering surface at a temperature above about 175° F. and below the melting point of the crystals to remove the crystals from the solution, and recovering crystalline urea having a biuret content substantially the same as the biuret content of the urea in the solution.

2. A process for producing crystalline urea having a biuret content less than about 0.10 weight percent comprising introducing an aqueous urea solution containing from about 70 to 92 weight percent of urea having a biuret content less than about 0.10 weight percent into a crystallization zone in which the solution is provided with a surface exposed to an inert, moisture-absorbing gas, said zone containing a rotating drum which skims the surface of the solution, maintaining the temperature of the solution in the zone within the range of about 170 to 270° F. to effect evaporation of water from the solution and formation of urea crystals on the surface of the solution, which crystals migrate toward, contact and adhere to the surface of the drum, removing the urea crystals from the solution on the surface of the drum, said drum surface having a temperature of above about 175° F. and below the melting point of said urea crystals and having a residence time in the urea solution of at least about 7 to 30 seconds, and removing said urea crystals from the drum surface.

3. The process of claim 2 wherein the crystallization zone is enclosed, the moisture-absorbing gas is non-saturated air at a temperature of about −20 to 100° F., and said air is blown across the surface of the solution to remove air which becomes saturated with moisture.

4. The process of claim 2 wherein the depth of said drum surface in said urea solution is from about 1/16 to 6 inches.

5. The process of claim 2 wherein the temperature of said drum surface is from about 185° to 250° F.

6. The process of claim 2 wherein a non-saturated, inert gas stream is blown across the surface of said urea solution to enhance crystallization.

7. The process of claim 5 wherein said gas is air.

8. The process of claim 2 wherein said crystallization zone is enclosed and further including passing a stream of non-saturated air across the surface of said urea solution.

9. The process of claim 2 further including withdrawing diluted urea solution from said crystallization zone, heating said diluted solution at a temperature of from about 140° F. to 180° F. to reconcentrate it, and introducing the reconcentrated urea solution into said crystallization zone.

10. The process of claim 2 wherein said drum surface is irregular.

11. The process of claim 2 wherein the rate of evaporation of water from the urea solution in the feed pan is controlled to maintain the concentration of urea solution fed to said zone at between 70 and 92 weight percent.

12. The process of claim 2 wherein the urea solution fed to said zone has a concentration of between 79 and 87.5 weight percent whereby a urea product containing moisture of less than about 1 weight percent is produced.

13. The process of claim 2 wherein the temperature of the solution is maintained between about 185° and 210° F. and said feed solution is between 79 and 87.5 weight percent urea.

References Cited

UNITED STATES PATENTS

| | | | |
|---|---|---|---|
| 3,299,132 | 1/1967 | Dougherty | 260—555 |
| 2,606,140 | 8/1952 | Arnold et al. | 260—555 |

FOREIGN PATENTS

| | | | |
|---|---|---|---|
| 1,127,788 | 12/1956 | France | 260—555 |

OTHER REFERENCES

Gross et al., A.S.T.M. Bulletin, March 1948, pp. 55–59.

Hendricks, J. Am. Chem. Soc., vol. 50, pp. 2455–2464 (1928).

LEON ZITVER, Primary Examiner

M. W. GLYNN, Assistant Examiner

U.S. Cl. X.R.

23—273, 295

UNITED STATES PATENT OFFICE
CERTIFICATE OF CORRECTION

Patent No. 3,585,237     Dated June 15, 1971

Inventor(s) Leo A. Miller and Jack D. Terrana

It is certified that error appears in the above-identified patent and that said Letters Patent are hereby corrected as shown below:

Column 5, line 58, "The" should read -- This --.
Columns 7 and 8,

Table II, that portion reading

Product (percent urea)_____94.7
                                        No should read Product (percent urea)_____94.7
    Air Stream_____ No

UNITED STATES PATENT OFFICE
CERTIFICATE OF CORRECTION

Patent No. 3,585,237      Dated June 15, 1971

Inventor(s) Leo A. Miller and Jack D. Terrana     PAGE - 2

It is certified that error appears in the above-identified patent and that said Letters Patent are hereby corrected as shown below:

Table II, that portion reading

|  |  |  |
|---|---|---|
| $\overline{290}$ | | $\overline{I \atop 205}$ |
| 205 | | 200 |
| 200 | should read | 200 |
| 3 | | 3 |
| 1 1/2 | | 1 1/2 |
| 99.2 | | 99.2 |
| Yes | | Yes |

Table III, that portion reading

|  |  |  |
|---|---|---|
| $\overline{205}$ | | $\overline{9 \atop 205}$ |
| 208 | | 208 |
| 208 | should read | 206 |
| 3 | | 3 |
| 87.5 | | 87.5 |
| 98.8 | | 98.8 |
| 51 | | 51 |
| 4.07 | | 4.07 |

Column 8, line 73, "claim 5" should read --claim 6--.

Signed and sealed this 8th day of February 1972.

(SEAL)
Attest:

EDWARD M. FLETCHER, JR.
Attesting Officer

ROBERT GOTTSCHALK
Commissioner of Patents